US012104965B2

(12) United States Patent
Gnessin et al.

(10) Patent No.: US 12,104,965 B2
(45) Date of Patent: Oct. 1, 2024

(54) DRY WELL TEMPERATURE CALIBRATORS, COOLING SYSTEMS, AND METHODS

(71) Applicant: King Nutronics, LLC, Woodland Hills, CA (US)

(72) Inventors: Amir Gnessin, Woodland Hills, CA (US); Terry C. Lew, Woodland Hills, CA (US); Nathan J. Ransom, Woodland Hills, CA (US); Guy Soffer, Woodland Hills, CA (US)

(73) Assignee: King Nutronics, LLC, Woodland Hills (CA)

( * ) Notice: Subject to any disclaimer, the term of this patent is extended or adjusted under 35 U.S.C. 154(b) by 495 days.

(21) Appl. No.: 17/444,363

(22) Filed: Aug. 3, 2021

(65) Prior Publication Data
US 2022/0042861 A1    Feb. 10, 2022

Related U.S. Application Data

(60) Provisional application No. 63/061,649, filed on Aug. 5, 2020.

(51) Int. Cl.
*G01K 15/00* (2006.01)
(52) U.S. Cl.
CPC ................... *G01K 15/002* (2013.01)
(58) Field of Classification Search
CPC ........................ G01K 15/002; G01K 15/005
USPC .......................................... 374/1, 208, 4, 5
See application file for complete search history.

(56) References Cited

U.S. PATENT DOCUMENTS

| 3,406,953 A | * | 10/1968 | Moore | B01D 47/10 |
| | | | | 261/DIG. 54 |
| 3,939,687 A | * | 2/1976 | Waldron | G05D 23/24 |
| | | | | 374/1 |
| 4,786,859 A | * | 11/1988 | Arseneau | G01R 19/02 |
| | | | | 324/132 |
| 4,863,374 A | | 9/1989 | Vukovich, Jr. | |
| 7,607,309 B2 | * | 10/2009 | Liebmann | G01K 15/005 |
| | | | | 62/3.3 |
| 7,669,427 B2 | | 3/2010 | Walker et al. | |

(Continued)

FOREIGN PATENT DOCUMENTS

CN    203719333 U    *    7/2014
CN    103773923 B    *   11/2015

(Continued)

OTHER PUBLICATIONS

17444363_2023-10-21_CN_209058020_U_H.pdf,Jul. 5, 2019.*

(Continued)

*Primary Examiner* — Gail Kaplan Verbitsky
(74) *Attorney, Agent, or Firm* — Knobbe, Martens, Olson & Bear, LLP (57) ABSTRACT

Various dry well temperature calibration systems, as well as other temperature control systems, are disclosed. The system can include a well configured to receive a unit under test, a heater configured to heat the well, and a temperature sensor configured to detect a temperature of the well. The system can include a helical airflow groove around the well. A venturi pump unit can be in fluid communication with the airflow groove. The venturi pump unit can be configured to draw a flow of air through the airflow groove, thereby cooling the well.

15 Claims, 6 Drawing Sheets

(56) References Cited

U.S. PATENT DOCUMENTS

| | | |
|---|---|---|
| 7,785,000 B2 | 8/2010 | James et al. |
| 7,909,504 B2 | 3/2011 | Sjogren et al. |
| 8,721,173 B2 | 5/2014 | Harslund et al. |
| 8,801,271 B2 | 8/2014 | Harslund et al. |
| 11,733,108 B2 * | 8/2023 | Zhao .................. G01K 15/005 374/1 |
| 11,740,139 B2 * | 8/2023 | Gao .................. G01K 15/002 374/1 |
| 2007/0289314 A1 | 12/2007 | Liebmann et al. |

FOREIGN PATENT DOCUMENTS

| | | | |
|---|---|---|---|
| CN | 206139972 U | * | 5/2017 |
| CN | 209058020 U | * | 7/2019 |
| CN | 113385132 A | * | 9/2021 |
| EP | 2835623 B1 | | 5/2017 |
| JP | 2000300424 A | * | 10/2000 |
| SU | 981855 A | * | 12/1982 |

OTHER PUBLICATIONS

17444363_2023-10-20_CN_206139972_U_H.pdf,May 3, 2017,May 3, 2017.*
17444363_2023-10-20_CN_103773923_B_H.pdf,Nov. 25, 2015.*
17444363_2023-10-20_CN_203719333_U_H.pdf,Jul. 16, 2014.*
17444363_2023-10-20_CN_113385132_A_H.pdf,Sep. 14, 2021.*
17444363_2024-01-30_JP_2000300424_A_H.pdf,Oct. 31, 2000.*
Paragon Industries, L.P., "Paragon Ceramic Kiln Instruction & Service Manual," 2008, in 48 pages.
King Nutronics Corporation, "KNC Model 3603-A, 3604-A, and 3605-A Thermal Units," May 2013, in 4 pages.
Fluke Corporation, "9103 Dry-Well User's Guide," Mar. 2013, in 54 pages.
Wika Alexander Wiegand SE & Co. KG, "Temperature dry-well calibrator," WIKA data sheet CT 41.28, Sep. 2019, in 10 pages.

* cited by examiner

DRY WELL TEMPERATURE CALIBRATORS, COOLING SYSTEMS, AND METHODS

CROSS REFERENCE

This application claims the priority benefit of U.S. Provisional Patent Application No. 63/061,649, filed Aug. 5, 2020, the entirety of which is incorporated by reference herein.

BACKGROUND

Field

The present disclosure relates to improved dry well temperature calibrators, as well as other temperature control systems, such as systems for controlling and/or cooling kilns, ovens, etc.

Certain Related Art

Dry well temperature calibrators are used for calibrating temperature indicating or responsive devices like thermometers, sensors, switches, and other instruments. The temperature calibrator is comprised of a metallic mass with a cavity and an opening that enables insertion of a unit under test (UUT), such as a thermometer or temperature switch. The well has one or more heating elements and at least one internal temperature sensor that can precisely measure the well temperature. An electrical control system reads the temperature sensor output and controls the heating elements.

In a temperature calibration operation, the UUT is subjected to elevated temperatures in the well. The UUT's detected temperature is compared to the calibrator's detected or displayed temperature value and the difference is noted as the UUT error. After a calibration cycle at the elevated temperature is completed, the well is typically allowed to cool to approximately room temperature. Airflow can be used to cool the well.

Figure 1:
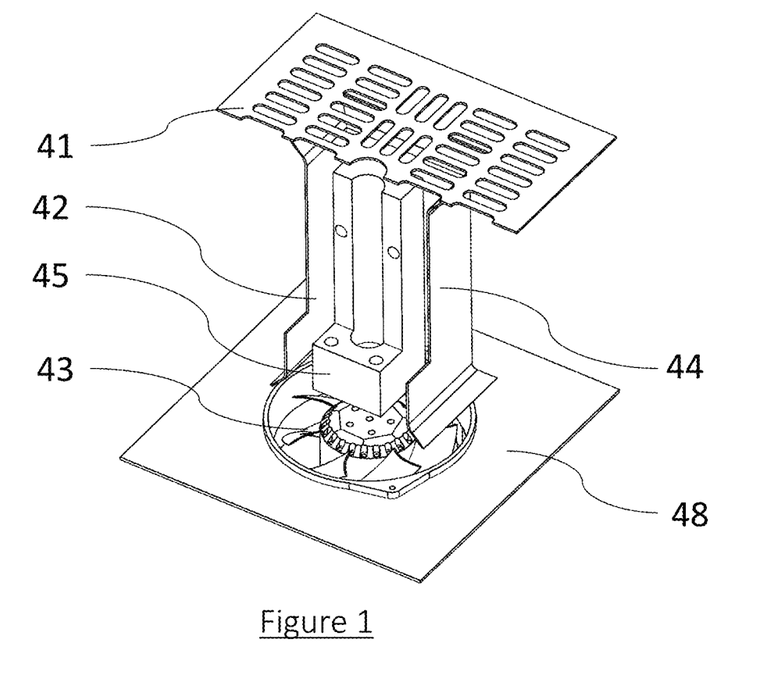
FIG. 1 illustrates an isometric section of a dry well with vertical channels.

FIG. 1 illustrates a typical cross section of a well (42). The well (42) is cooled by a fan (43) that is installed on the bottom of the calibrator case (48). The airflow is directed upward and flows through a channel that surrounds the metal well block (45). The hot air exhaust is through a grate (41) that is mounted as a cover above the well (42). The constant flow of air creates a barrier between the extremely hot surface of the well (42) and the metal case (44). When the system is in "soak mode," where a stable temperature is maintained in the well, the fan speed is adjusted to minimum to create sufficient airflow that serves as a thermal barrier. However, the flow inadvertently also cools down the well.

When cooling is required, the fan speed increases and significant amount of hot air flows upward. In the first moments after operation of the dry well at 1,250° F., the hot air that is exhausted can have a temperature of 1,000° F. or more. Some wells add insulation between the well and/or restrict the airflow by channeling it through small vertical channels. However, the hot air still flows upward during most of the calibration cycle. Some manufacturers suggest adding brackets to be mounted as an accessory above the well to direct the flow of hot air away from UUTs or operator.

Overview of Certain Features

Known temperature calibrators and wells suffer from multiple problems and drawbacks. The hot air flowing upward from the top of the well creates a safety hazard to operators. Given the high temperature of discharged air, and the fact that the system's display may be located near the well opening, even an insignificant draft of hot discharged air can cause burns or discomfort to the operator and other persons, and/or damage to the surrounding environment.

The continuous loss of energy to the environment can require the use of high-power heaters that can heat-up and maintain elevated temperatures while air flows continuously around the well either by forced air or by convection due to natural draft. This can have a significant negative effect on the energy efficiency of the system and/or can require increased operational power requirements.

A sudden change in ambient temperature can have an effect on the well, especially designs in which the well is exposed to outside air at all times. If the ambient temperature change happens while the well is soaking at a specific elevated temperature, then the well temperature may momentarily change before the control system manages to recover from the error. This can be a significant concern, such as when the system is being used in windy condition (e.g., marine applications) since the sudden change of temperature might affect the UUT reading accuracy.

Hot air flowing upward may also heat up an electrical connection box of the UUT. Many UUTs incorporate sensitive electronics such as transmitters in the connection box, which may be positioned directly above the stem of the sensor to minimize the distance between the sensing element and the measurement circuit or other electronics. The hot air may heat up the circuits thus affecting the reading, or cause other problems.

Some wells use only, or primarily, thermal convection on the outside of the well's case for cooling. This can have the effect of the well's temperature dropping slowly. Some wells take up to 8 hours to go from a test temperature of 1,200° F. to a safe temperature of 150° F. Additionally, some UUTs may include structures (e.g., electronics boxes) that at least partially block the opening on the top of the well, which can inhibit or prevent cooling air from escaping, thereby further extending the time needed to cool the well.

The disclosed technology can address one or more of these problems or other problems, and/or can provide significant advantages, such as one or more of the advantages described below or other advantages.

Various embodiments of the present disclosure relate to an efficient dry well temperature calibrator system. The system can require significantly less energy to operate compared to other high temperature calibrators. The improved power efficiency of certain embodiments of the present technology stems at least in part from the highly insulated construction of the well, and/or from air openings that are positioned low on the well. As such, little or no air can escape (e.g., upward) by natural convection and/or low wattage heating elements can be used. The top of the well can be covered by doors with an aperture shaped to match the diameter of the UUT. In some embodiments, the temperature of the top panel and/or the doors of the well are maintained at a low enough temperature to enable the top panel and/or doors to be touched by an operator's hand, even when the system is at 1,200° F. In certain embodiments, as there is little to no heat loss from the well, there is no need to use high-power heating elements. For comparison, a non-insulated well may use heating elements in the range 1,100-1,500 Watts. Certain wells of the present disclosure can maintain similar performance while consuming just 180 Watts or less. The significant decrease in power requirement of the new system enables the use of portable lithium power banks as small as 1,000 Watts/hour size for about 10 hours.

Improved energy efficiency (e.g., battery life and/or uptime of the system per battery charge) can be significant. This enables calibration in remote area, such as in servicing certain utility lines. Also, improved energy efficiency can eliminate or reduce the need to connect the system to customer's electrical circuits when calibration is performed in their facility, which can reduce or avoid tripping circuit breakers.

In certain embodiments, the system is configured for use with multiple power sources, such as dual power sources (e.g., alternating current (AC) and direct current (DC)). In some variants, AC power is used in a first stage, then DC power is used in a second stage. AC power enables fast heating and its components require little space and weight for its operation. AC power can be used for heating up the well and its layers of insulation. In some embodiments, in the first stage, AC power is used to preheat the well to bring the well near a target temperature and/or for coarse control of temperature. In certain implementations, in the second stage, DC power is used to maintain the temperature of the well. Only a very small amount of power is needed to maintain the well temperature at a target temperature (a "set point"). DC power, such as a small high-quality regulated DC power supply, can be used for fine control of temperature at set point. The use of DC power supply can eliminate or reduce the control circuit's sensitivity to AC power level variations that typically occur in industrial and marine applications.

In several embodiments, the system provides improved cooling of the well or other articles. Air discharged from the system can exit the system sideways, rearward, or otherwise in a direction away from an operator. In various embodiments, the air is not discharged upward and/or in a direction generally parallel with a longitudinal axis of the UUT when installed in the system. The system can be configured to mix hot air from the well with cooler air, thereby discharging mixed air that is safe for contact with the operator. Several implementations of the present technology solve the slow cooling issue of the systems without sacrificing one or more of the other mentioned benefits of the sealed well concept.

According to certain implementations, a dry well temperature calibration system includes a well configured to receive a UUT, a heater configured to heat the well, and a temperature sensor configured to detect a temperature of the well. The system can include an insulation layer positioned around the well. The insulation layer can be a cast ceramic, fibrous material, or other material.

The system can include an airflow passage, such as an airflow groove. The airflow passage can be located in the insulation layer or elsewhere. The airflow passage can have various shapes, such as helical, spiral, cylindrical, or otherwise. The airflow passage can have an upper opening and a lower opening. The upper opening can be positioned near an upper end of the well. The lower opening can be positioned near a lower end of the well. The airflow passage can encircle the well, such as at least: twice, three times, or more. The system can have a venturi pump unit in fluid communication with the airflow passage.

The system can have a channel in fluid communication with the airflow passage. The channel can include a channel upper opening and a channel lower opening. The channel upper opening can be positioned above the channel lower opening.

The system can include a well case. The well, heater, temperature sensor, and insulation layer can be positioned within the well case. The channel can be positioned on an exterior wall (e.g., radially outer) of the well case.

In certain implementations, a dry well temperature calibration system includes a well configured to receive a UUT, a heater configured to heat the well, a temperature sensor configured to detect a temperature of the well, and an airflow passage at least partly encircling the well. A well assembly can include the well and the airflow passage. In some embodiments, air enters and/or exits the well assembly at or near a bottom end of the well assembly.

The system can include a venturi pump unit. The venturi pump unit can be in fluid communication with the airflow passage. The venturi pump unit can be configured to draw a flow of air through the airflow passage, thereby cooling the well. The venturi pump unit can be configured to draw the flow of air downward through the airflow passage. The venturi pump unit can be positioned at an outlet opening of the airflow passage.

The system can include an air handling system. The air handling system can include the venturi pump unit. The air handling system can include a blower. The air handling system can have a movable shutter door. The air handling system can be configured to convey air in a direction that is generally perpendicular to a longitudinal axis of the well. In some embodiments with a blower and a venturi pump, the blower is positioned upstream of the venturi pump unit.

According to certain implementations, a cooling system that is configured to cool a heat chamber includes a blower, ducting positioned downstream of the blower, and a shutter door positioned downstream of the ducting. The shutter door can be configured to move between an open position and a closed position. The cooling system can include a linear actuator configured to move the door between the open position and the closed position. The ducting can include a venturi pump. The ducting can be in fluid communication with an opening in the heat chamber.

The cooling system can be configured such that, during operation of the blower and when the shutter door is in the open position, the cooling system pulls air out of the opening in the heat chamber. The cooling system can be configured such that, during operation of the blower and when the shutter door is in the closed position, the cooling system pushes air into the opening in the heat chamber. Transitioning the shutter door between open and closed positions can result in a change (e.g., reversal) of the direction of the airflow passing through the heat chamber. For example, in some embodiments, when the shutter door is open, air can flow from out of the heat chamber into the ducting and/or when the shutter door is closed, air can flow from out of the ducting into the heat chamber.

The cooling system can have a temperature sensor configured to detect a temperature of the heat chamber. The system can be further configured to move the shutter door from the open position to the closed position in response to the detected temperature of the heat chamber being less than or equal to a threshold temperature. For example, the threshold temperature can be less than or equal to about: 550° F., 600° F., 650° F., 700° F., or otherwise.

The cooling system can be incorporated in a variety of apparatuses. In some implementations, a dry well temperature calibration system includes a dry well assembly and the cooling system. The dry well assembly can include the heat chamber. In some implementations, a ceramic baking system includes a kiln and the cooling system. The kiln can include the heat chamber.

In certain implementations, a dry well temperature calibration system includes a well configured to receive a UUT, a heater configured to heat the well, and a temperature sensor configured to detect a temperature of the well.

The system can include a dual power supply. The dual power supply can be in operative communication with the heater. The dual power supply can include an AC power source and a DC power source. The AC power source can be, for example, an unregulated AC power supply and the DC power source can be, for example, a regulated DC power supply. In some variants, the DC power source is a battery.

The system can include a controller, such as a processor and a memory. The controller can be in operative communication with the temperature sensor and dual power supply. Under the control of the controller, the system can be configured to power the heater with the AC power source in a first stage and/or to power the heater with the DC power source in a second stage. In some embodiments, the second stage occurs during at least a temperature soak period of operation of the well temperature calibration system. In certain implementations, the system is configured to change from the first stage to the second stage in response to the controller determining that a power output from the AC power source is less than or equal to a threshold value.

In certain variants, the system, and/or methods of cooling a well or other heat chamber, comprises a first mode and a second. The first mode can include conveying (e.g., pulling) air in a first direction through a groove (e.g., a helical groove) around the well. The second mode can include conveying (e.g., pushing) air in a second direction through the groove. The second direction can be opposite to the first direction. For example, the first direction can be clockwise around the well and the second direction can be counter-clockwise around the well, or vice versa. In certain implementations, in the first mode air can flow in a downward direction through the groove and/or in the second mode air can flow in an upward direction through the groove. In several embodiments, the transition from the first mode to the second mode can occur in response to a temperature of the well reaching a predetermined value, such as less than or equal to about 650° F. In some embodiments, a shutter door can be fully or partially closed to transition from the first mode to the second mode.

For purposes of summarizing the disclosure, certain aspects, advantages, and features of the disclosed technology have been described herein. Not necessarily any or all such advantages are achieved in accordance with any particular embodiment of the technology disclosed herein. No aspects of this disclosure are essential or indispensable. Neither the preceding summary nor the following detailed description purports to limit or define the scope of protection. The scope of protection is defined by the claims.

BRIEF DESCRIPTION OF THE DRAWINGS

Certain features of this disclosure are described below with reference to the drawings. The illustrated embodiments are intended to illustrate, but not to limit the embodiments. Various features of the different disclosed embodiments can be combined to form further embodiments, which are part of this disclosure. No features, structure, or step disclosed herein is essential or indispensable.

DETAILED DESCRIPTION OF CERTAIN EMBODIMENTS

Various dry well temperature calibration systems are described. The dry well temperature calibration system can include an innovative dry well that is capable of rapidly heating and/or cooling, and/or of maintaining a stable and accurate temperature while soaking at the designated set point in lab and field applications. Several embodiments of the system enhance safety, such as by not discharging dangerously hot air. Some embodiments have a negligible impact on the temperature of the surrounding environment. The system can be adapted to enable energy efficient operation, such as at least partly due to hybrid power (AC/DC) control and/or a sealed well. In some embodiments, a small portable battery, such as a 1000 Wh, 270,000 mAh lithium-ion battery pack, can power the system for several hours (e.g., such as at least about 8 hours) of continuous operation of typical operational cycles. Certain implementations of the system have other benefits, such as increased convenience, accuracy, and/or speed.

1. Overview of Dry Well Temperature Calibration Systems

Dry well temperature calibration systems are used for calibration of temperature indicating devices like thermometers, sensors, switches, and other instruments. Because such systems are often used to calibrate instruments that are themselves required to operate with high accuracy and precision, the dry well temperature calibration system too must operate with high accuracy and precision. In this regard, the dry well temperature calibration system can be required to achieve highly exact and stable temperature parameters during a calibration operation. As such, it is typically desired to pack the heat-conductive well in thermal insulation to isolate it from the surrounding ambient. The insulation also reduces or minimizes heat loss from the well, thus enabling the use of minimal energy to heat and maintain stable temperature state in the system.

However, the packed insulation layers create a challenge for cooling. Leaving an open cooling gap for airflow passage close to the well walls defeats the purpose of the insulation. In some well designs, the gap forms vertical channels next to the metallic wall of the well. The vertical channel enables movement of air due to draft that is induced by the heated air moving upwards. Allowing a temperature gradient in the surrounding air may affect the temperature uniformity in the well itself. Additionally, the heated air that constantly flows from the top of the well can create a safety hazard to the operator and/or can affect the accuracy of temperature reading, such as when the UUT has electrical circuits at the top. Losing heat to the surrounding ambient via convection through the top openings of the channels reduces the energy efficiency of the system thus increasing its electrical power consumption. Additionally, continuously discharging hot air into a lab environment may affect the room temperature control system and/or overload its HVAC systems, especially when multiple calibrators are used simultaneously.

In addition to lab environments, dry well temperature calibrators are also utilized in field calibration applications. In such applications (e.g., industrial environments or servicing customers at their sites), energy and throughput efficiencies can be important characteristics of the temperature calibrator. To reduce the time required for a given calibration session, it is desirable not only for the well to heat up and stabilize rapidly, but also to cool down quickly in order to begin the next calibration operation or to allow for safe transfer of the system to the next site. Due to safety issues, it is generally not recommended to pack and move a dry well calibration device when the well temperature is above 150° F. Also due to the need to connect the system to a power outlet, it is desired that the power consumption will not overload the calibration site's electrical circuit, thus possibly tripping breakers that may be also servicing other devices or otherwise cause problems.

As mentioned above, operator safety is a major concern in the design of a temperature calibrator. Some dry well temperature calibrators can reach 1,250° F. or more. The air that is typically discharged from the top of the well during and after calibration cycles can be at or near such very high temperatures. This heated air can be a burn hazard directly, such as if a user were to place a body part in or near the flow of such heated air. The heated air can be an indirect burn hazard, such as by heating metal surfaces (e.g., of the temperature calibrator or surrounding objects) that a user may contact. Further, the heated air may damage internal components (e.g., electrical components of the calibrator) and/or nearby external structures (e.g., if the temperature calibrator were placed underneath shelving or other structure that could be damaged by such heated air). It is therefore desired to reduce and/or limit the temperature of the air that is discharged from the well, and/or to redirect the flow pattern. This can reduce or avoid injury and/or damage.

An aspect of the current disclosure relates to an improved dry well temperature calibrator. The dry well temperature calibrator can have one or more of the following features: is energy efficient, can run off a portable battery, is fast to heat and/or to cool down, and/or is safe to operate without sacrificing performance in lab and field operations. The dry well calibrator can require less or minimal energy to heat up and/or to maintain stable temperature at set point.

Another aspect of the current disclosure relates to an improved cooling system. In some embodiments, cooling the well is accomplished by activating a variable speed blower that generates airflow. In some implementations, the well includes a unique passage or channel (e.g., groove) that surrounds the well and/or its heaters. The channel can have a helical, spiral, cylindrical, or other shape. The inlet and outlet of the cooling channel can be at the bottom of the well housing or close to the bottom of the well housing. An effect of such a design can be that hot air that rises within the insulation and/or the cooling channel (e.g., due to draft) cannot escape from well. The cooling system of the dry well calibrator can incorporate a main fan or blower that generates a significant airflow across the system. The flow can be generally perpendicular to the axis of the well. The outlet of that flow can be from a side opening in the main case. The hot air that exits the well's cooling channel when the well's blower is activated mixes with the main flow resulting in a mildly warm airflow discharging from the side opening of the calibrator case. In certain embodiments, the blower is configured to push (rather than pull) the air and/or is positioned upstream of a junction an outlet of the well's cooling channel.

A further aspect of the current disclosure relates to the manner by which hot air from the well is drawn out and/or is mixed with cooler (e.g., ambient) air. Certain embodiments include a special venturi pump. The pump can reduce or avoid issues with potentially extremely hot air blowing out of the well housing (e.g., when a well at about 1,250° F. starts to cool down), and the risk of locally elevated air temperature damaging components of the calibrator or surrounding structures. The pump can be mounted on the well's housing wall. The outlet of the cooling blower can be connected through the venturi pump to an exit at the wall of the system. In some embodiments, at or near the exit, a solenoid-operated shutter can reduce or block the airflow when activated. The vacuum side of the pump can be mounted onto the cooling air exit of the well. When cooling a well from temperatures (such as higher than about 650° F.) the blower can be activated (e.g., in high speed) and shutter opens, which causes a venturi effect at the exit of the well, thereby causing the hot air from the well to be pulled into the stream of airflow from the blower. The hot airflow mixes with the blower airflow, thus reducing its temperature.

Yet another aspect of the current disclosure relates to a reversing airflow system. In some implementations, when the well temperature decreases to less than or equal to a certain temperature (e.g., about 650° F.), the shutter partially or completely closes. This can cause the airflow direction to reverse, such as within the airflow channel. In some embodiments, the reversed airflow from the blower passes into the well. The hot air from the well then exists from the other opening that was previously used as inlet. The blower speed can be reduced significantly, since the cooling air is flowing directly into the well.

A further aspect of the present disclosure relates to the heating system. In certain embodiments, the cylindrical well is heated by two generally helical or spiral heating coils that are attached to the well's metal surface. The two coils can be individually controlled, thus enabling the system to tightly control temperature uniformity along the axis of the well. The combination of cylindrical well, concentric heating coils and concentric cooling channels maintains superior circular temperature uniformity in the well.

Another aspect of this disclosure is directed to temperature sensing elements. The metallic well can incorporate at least two types of sensors. A first sensor can be a high-grade platinum resistance thermometer (PRT) element or other temperature sensor. The first sensor can be located inside the well's wall close to the bottom and provides accurate temperature reading. A second sensor can be a temperature uniformity measurement device that senses the difference in temperature between the bottom and top portions of the well. The second sensor can be located inside the wall of the well, such as generally opposite the PRT. The first and second sensors, together with a third ambient temperature sensor, provide information to a control board that activates the heating elements accordingly.

Still another aspect of the current disclosure relates to a control system. In some embodiments, the heating elements are energized by a unique dual-power closed loop control system. The heaters are powered by modulated AC (alternating current) power when they heat up. Once the well temperature gets close to the set point, the power source switches to a regulated DC (direct current) power supply that keeps driving the heaters through their stabilization period and maintains the temperature while soaking at the set point. The AC source can generate the significant amount of energy that is required to heat up the well assembly quickly to the next set point. The AC source is usually a regular wall outlet that is not regulated and can vary significantly, especially when supplied by a generator in field applications. However, using DC power when the actual temperature is near the set point has many advantages, including improved accuracy and dynamic behavior.

A further aspect of the present disclosure relates to portability. In various embodiments, the well is thermally insulated and sealed, which can be significant in making the well energy efficient. In certain implementations, the main mechanism of heat loss is by conduction from the exposed top of the well and its metal housing. Such heat loss can be affected and/or controlled by activating the cooling blower when necessary. Due to the significantly reduced or minimal heat loss, several embodiments of the system require very low power for heating up and maintaining the well at the set point while soaking. In certain embodiments, because the peak and the continuous power levels are very low, the system can run off a small portable battery, such as lithium battery pack in field applications. This makes the unit portable and usable in a variety of locations and environments.

Another aspect of the present disclosure relates to customization of the system for use in different temperature use ranges. In some variants, the dry well temperature calibrator system is configured for use in a temperature range of about 95° F. to about 650° F. In some variants, the dry well temperature calibrator is configured for use in range of a temperature range of about 95° to about 1,250° F. The materials in the well or other aspects of the system can be different depending on the temperature range, but the general assembly structure can be similar. For example, the cooling channels, inlet and outlet being at the lower part of the well, one or more (e.g., two) helical heating elements, one or more (e.g., two) types of sensors, and/or other aspects can be similar or identical between the lower and higher-temperature versions. In some implementations, the lower temperature variant does not include the venturi-type pump and/or a shutter. In certain such variants, a significant portion of or the entire cooling process can be performed by blowing air into the cooling channel, since the lower operating temperature makes mixing of extremely hot air and cool blower air less important compared to a higher temperature variant.

A further aspect of the present disclosure is that the disclosed features can be used in a variety of systems. In certain variants, the cooling system, or other portions described herein, are incorporated in other non-calibration systems, such as ovens, kilns, or otherwise. For example, some embodiments of the subject matter of the present disclosure include a kiln with the venturi-pump, upstream blower, shutter, reversing airflow, and/or other aspects of the cooling systems described herein.

2. Example Dry Well Temperature Calibration System Generally

Figure 2A:
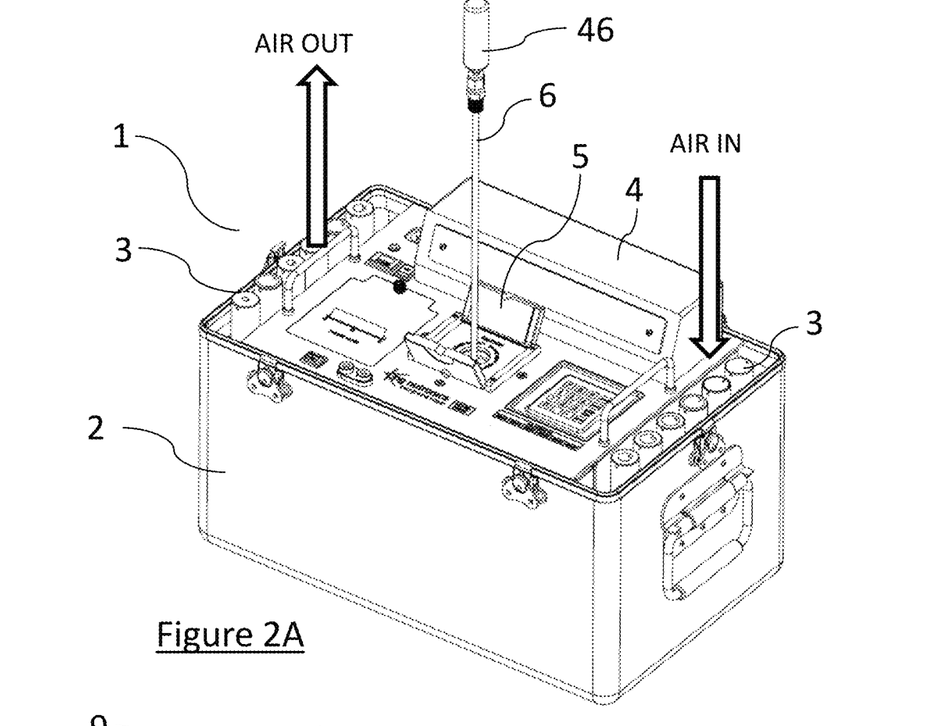
FIG. 2A illustrates an isometric view of an embodiment of a dry well temperature calibration system with a UUT mounted in the well, such as a system adapted for high temperature use.
Figure 2B:
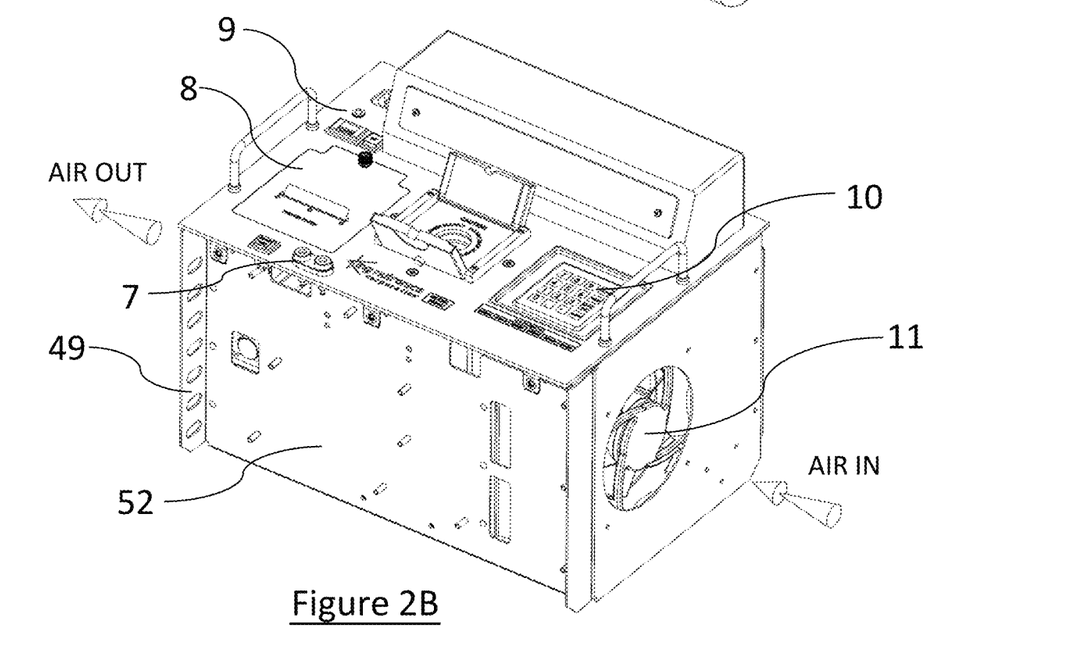
FIG. 2B illustrates an isometric view of the system of FIG. 2A with an outer case not shown for purposes of presentation.

FIGS. 2A and 2B illustrate a dry well temperature calibration system (1). The system can include a case (2) housing a frame (49) and an operator panel. In some implementations, the system (1) can be adapted for high temperature usage, such as up to or greater than temperatures of about 1,250° F.

The operator panel can include a display panel (4), such as a readout, electronic screen, or otherwise. The panel (4) can include a vacuum fluorescent display. The operator panel can include a user input, such as a keypad (10), and an output, such as a printer (8) (e.g., a dot matrix or thermal printer). An indicator light (9) is capable of changing its colors and blinking frequency as function of power type in use and well stability state. The light (9) can have multiple colors and/or be configured to indicate well power and/or temperature stability. The system (1) can have support peripherals, which can aid in operating and controlling the temperature or other operational parameters. A communication port, such as a general purpose interface bus (GPIB) (51), can be mounted on the operator panel, such as at the back of the display panel (4). The operator panel can include sockets (7) or other points for connection to a UUT (e.g., a temperature switch) being calibrated with the system (1). Other communication ports, such as USB or Serial 232, can also be implemented.

The frame (49) can include a fan (11). In certain embodiments, the fan (11) is configured to generate a cross-flow of air through the frame (49). For example, a flow that enters at one wall of the frame (49) (e.g., the right side in FIG. 2B) and exits from the left wall of the frame (49) (e.g., the left side in FIG. 2B).

When the frame (49) is mounted inside the case (2) a gap between the frame (49) and the case (2) sidewalls provides storage space for adapter chucks (3) and/or enables movement of cooling air in and out of the system (1). The adapter chucks (3) can enable testing of different size thermometers. Typically, a gap that is not larger than 0.010" between the UUT (6) and the adapter chuck (12) is desired or required for accurate results. The adapter chucks (3) can be made of metallic alloy that is similar to the well housing alloy.

3. Dry Well Assembly

Figure 3:
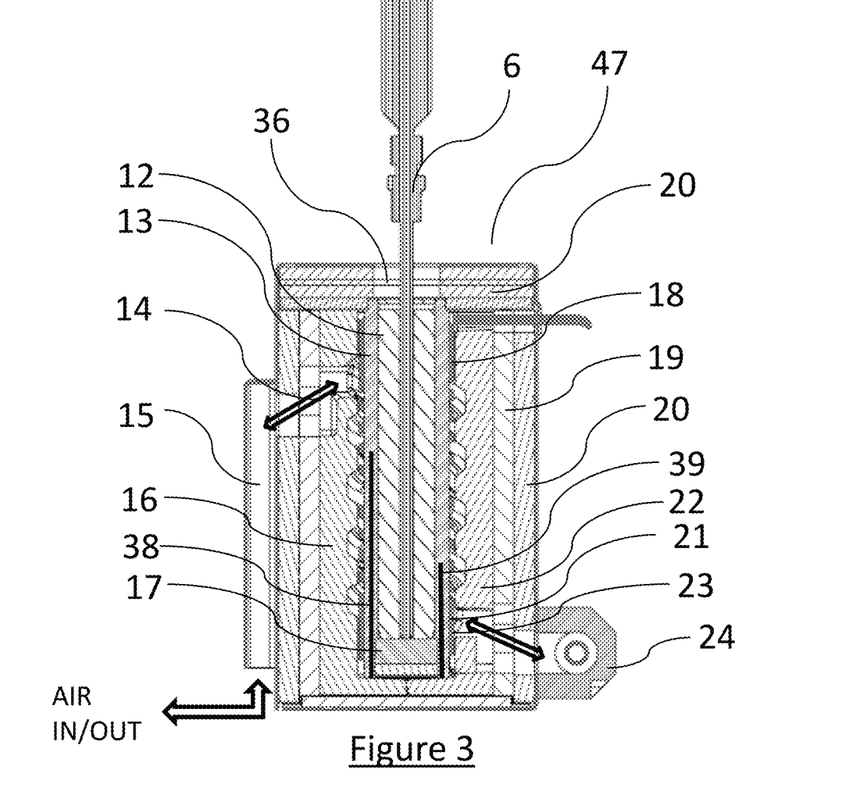
FIG. 3 illustrates a cross section of the well of FIG. 2A with a UUT mounted.

As shown in FIG. 3, the dry well temperature calibration system (1) can include a dry well assembly (47) (also called a well assembly). The well assembly (47) can have an opening (36) that can be covered with one or more (e.g., a pair) of insulating doors (5). The doors (5) can have ceramic fiber inserts. As illustrated, the well assembly (47) can be configured to receive a UUT (6), which can include an electrical connection box (46). The well assembly (47) can be manufactured as a tube for manufacturing efficiency considerations. A plug (17) can seal the bottom end of the well housing (13). The dry well assembly (47) can be mounted in a well case (40), such as a metal housing.

The dry well assembly (47) can include a well housing (13). In several embodiments, the internal diameter of the well housing (13) is in the range of about 1 inch to about 2 inches. The well housing (13) can be made of a conductive metal with high heat capacity. In some embodiments, the well housing (13) comprises copper, aluminum bronze, aluminum, or other materials. In certain variants, the well housing (13) comprises an aluminum alloy that maintain its strength at elevated temperature (e.g., at least about 650° F.), such as 7075 or A4032.

The dry well assembly (47) can include one or more temperature sensors (38, 39). In some embodiments, a first sensor (38) comprises a PRT temperature sensor (39). In some embodiments, a second sensor (39) comprises a uniformity sensor (38). The sensors (38, 39) can be mounted inside the well housing (13) wall and/or be located on opposite sides of the housing (13) from each other.

The dry well assembly (47) can include heating elements, such as coils. The heating elements can be electrical resistance elements or otherwise. The heating elements can be helical or spiral in shape. An upper heating element (18) can be mounted at the upper end of the well assembly (47) and a lower heating element (21) can be mounted at the lower end of the well assembly (47). As shown in FIG. 3, the heating elements can be snuggly mounted around the well housing (13).

The dry well assembly (47) can include insulating elements. Certain implementations include an insulation layer (16, 22) and intermediate insulation layer (19, 20). The well housing (13), temperature sensors (38, 39), and/or heating elements (18, 21) can be encompassed by or otherwise located within the inner insulation layer (16, 22). The inner insulation layer (16, 22) can be located within the intermediate insulation layer (19, 20). In some embodiments, one or more of the insulation layers (16, 22, 19, 20) is made of refractory material, such as castable ceramic. In some variants, the inner insulation layer (16, 22) comprises a refractory material and/or the intermediate insulation layer (19, 20) comprises a fiber material.

The inner insulation layer (16, 22) can have one or more cooling fluid (e.g., air) passages, such as grooves (50). In some implementations, the groove (50) comprises a helical or spiral channel around the well housing (13) and the heating coils (18, 21). The groove (50) can be helical, spiral, zig-zag, sinusoidal, cylindrical, elongate, or other shapes. In some implementations, the groove (50) comprises a chamber, such as a cylindrical chamber. The groove (50) can be continuous. The groove (50) can be located inside the well case (40) and/or be adjacent to the well housing (13). In several embodiments, air flowing through the groove (50) contacts the well housing (13). Openings (25, 26) can be located at respective ends of the groove (50) to allow airflow to enter and exit.

Figure 4:
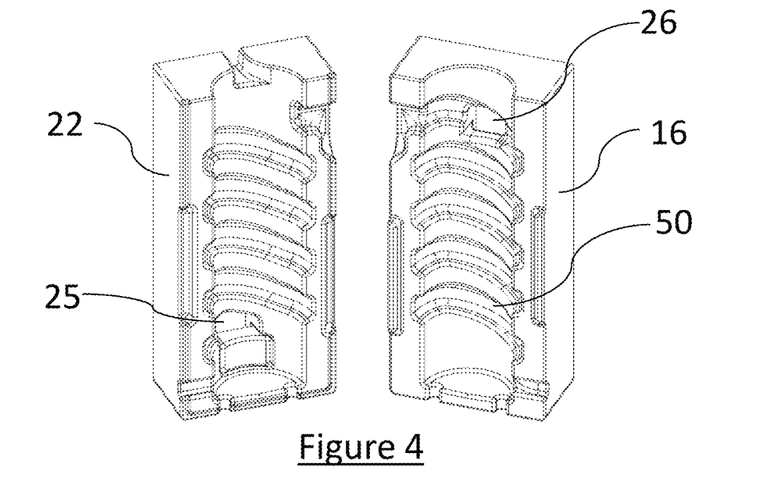
FIG. 4 illustrates an isometric view of matable insulators of the well of FIG. 3, with cooling grooves shown.

In some embodiments, the insulation elements comprise multiple mating components. For example, as shown in FIG. 4, some embodiments have a "clam shell" assembly of two components of the inner insulation layer (16, 22). When the clam shell parts are assembled around the well housing (13), grooves ends match and create the groove (e.g., a continuous helical or spiral channel) around the well housing (13) and the heating coils (18, 21). The two parts of the clam shell (16, 22) are typically connected together, such as at the contact plane with a high temperature glue.

The assembly comprising the well housing (13), temperature sensors (38, 39), heating elements (18, 21), and inner insulation layer (16, 22), and intermediate insulation layer (19, 20) can be mounted onto the well case (40). As illustrated, the assembly can be wrapped and/or surrounded by one or more intermediate insulation layers (19, 20). In some embodiments, the intermediate insulation layers (19, 20) comprise fibrous insulation, such as layers of Aerogel® and/or Kaowool®. The type of insulation can be varied to meet the highest service temperature of the calibrator.

The intermediate insulating layer (19, 20) can have apertures, such as cuts. For example, as shown, intermediate insulating layer (19, 20) can have an upper opening (14) and a lower opening (23). The upper and lower openings (14, 23) can correspond to the openings (25, 26) of the groove (50) of the inner insulation layer (16, 22). The openings (14, 23) and/or the openings (25, 26) can be positioned in a circumferentially and/or axially staggered manner. For example, the openings (14, 23) can be positioned generally circumferentially opposite each other. The upper opening (14) can be on an end of the well case (40) and/or the lower opening (23) can be on a bottom end of the well case (40). As illustrated, the upper and lower openings (14, 23) can open radially.

The upper opening (14) and the lower opening (23) can be in fluid communication with a channel (15). The channel (15) can be mounted on the side of the well case (40). The channel (15) can be bounded by metallic walls, such as a metal duct. A bottom end of the channel (15) can be open, such as to the interior of the frame (49) or the ambient environment. A top end of the channel (15) can be closed and/or otherwise configured to inhibit or prevent air from exiting from the channel (15) into an interior of the frame (49) or the ambient environment. The upper end of the channel (15) can have an aperture corresponding to the upper opening (14) such that air can pass between the channel (15) and the groove (50). In several embodiments, an inlet into the well case (40) and an outlet out of the well case (40) are in communication with the groove (50) and/or the channel (15).

The arrows in FIG. 3 show an example flow path into and out of the well case (40) (as described below, in certain embodiments the flow path is reversible). Certain embodiments comprise a labyrinth type connection between the holes in the well case (40) and the openings in the inner insulation layer (16, 22). In several embodiments, air enters and exits the dry well assembly (47) through openings located near the bottom of the dry well assembly (47), such as the bottom end of the channel (15) and the lower opening (23). This can inhibit or prevent an upward convective flow of air from exiting the dry well assembly (47).

Figure 5:
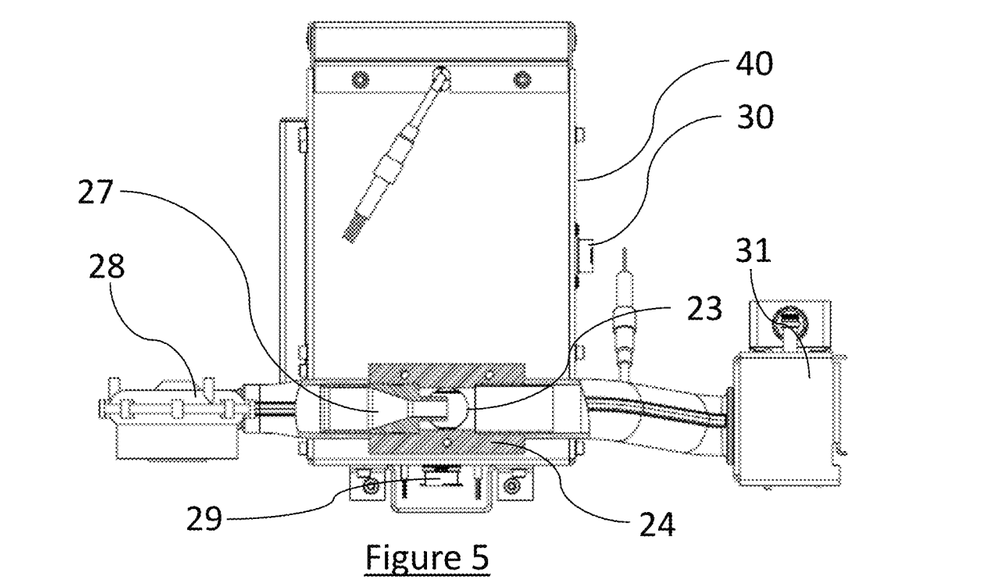
FIG. 5 illustrates a side view of a well with a cooling system having a venturi pump (which is shown in cross-section and along a main flow axis of the pump), which can be used with the system of FIG. 2A.

In some embodiments, the well case (40) includes one or more snap disc safety thermostats (see FIG. 5). For example, a thermostat can be mounted on a bottom facet (29) and another thermostat can be mounted on a sidewall (30). The activation temperature of such thermostats (29, 30) can be determined by the maximum operation temperature of the well and can vary between systems.

4. Venturi Pump

The dry well temperature calibration system 1 can include a Venturi pump (24). As described in more detail below, the Venturi pump (24) can aid in cooling the dry well assembly (47) and/or in tempering and/or controlling the temperature of air discharged from the system (1) into the ambient environment.

As shown in FIG. 5, the Venturi pump (24) can be part of an air handling system. The air handling system can include an inlet, the Venturi pump (24), and an outlet. In some embodiments, the inlet comprises a blower (28), such as a variable speed, brushless DC blower. In several embodiments, the blower (28) is configured to push air into the air handling system, rather than pulling air. The blower (28) can be positioned at or near the inlet into the air handling system and/or at a generally opposite end of the air handling system from the outlet. The blower (28) can connect to the Venturi pump (24) with ducting, such as a flexible conduit (35) that is made of molded silicon, polyurethane, aluminum, or otherwise. As shown, the blower can be located upstream of the Venturi pump (24). In some embodiments, the system (1) is adapted such that the blower (28) is not subjected to high temperature air from the well assembly (47). This enables, for example, the blower (28) to be made of plastics or materials that would not be appropriate for high temperature uses.

The Venturi pump (24) can include a flow restriction, such as a nozzle (27). The nozzle (27) can have a narrow end downstream of a wider end. As shown, an exit of the nozzle (27) can be positioned at or near the opening (23) into the well case (40). For example, a tip of the nozzle (27) can be located approximately at the center of the opening (23). The longitudinal axis of the nozzle (27) can be generally perpendicular to the longitudinal axis of the well assembly (47). In several embodiments, air passes through the Venturi pump (24) in a direction that is generally tangential to a circumference of the well assembly (47).

Figure 6:
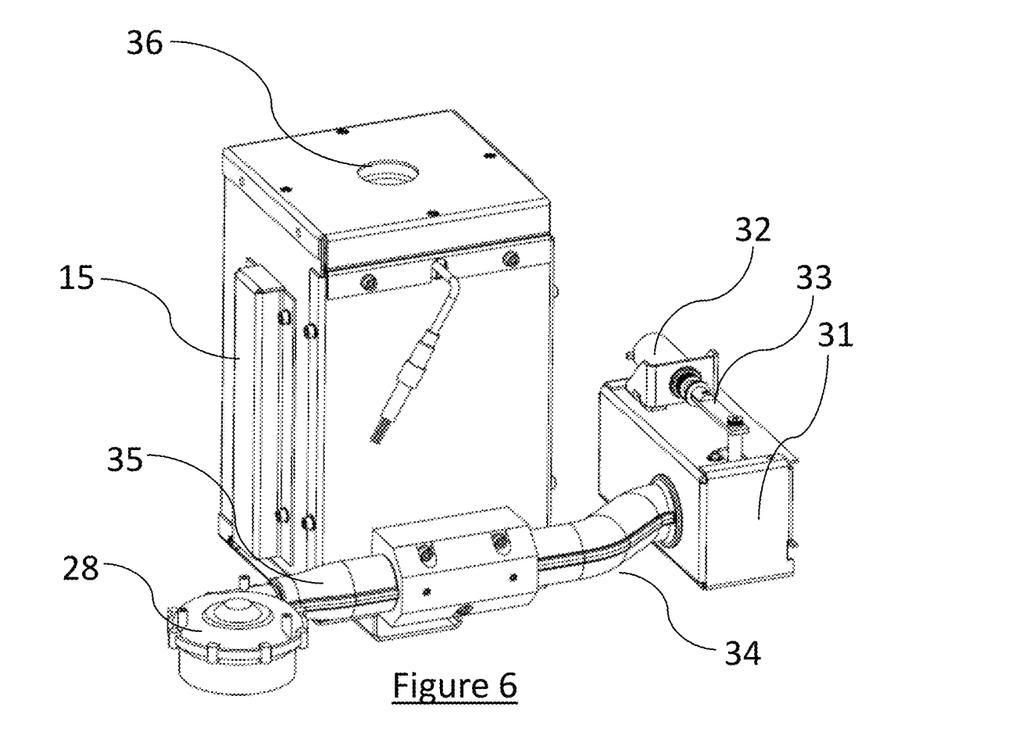
FIG. 6 illustrates an isometric view of the well and cooling system of FIG. 5.
Figure 7:
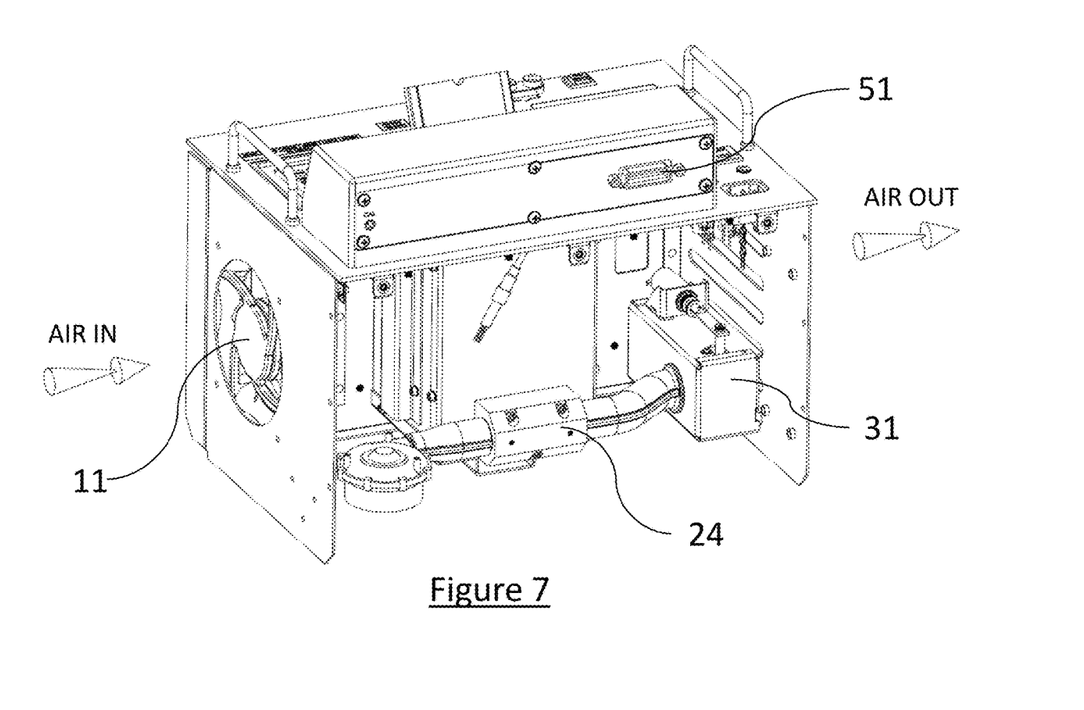
FIG. 7 illustrates an isometric back view of the system of FIG. 2A, with the well and cooling system of FIG. 5 shown.
Figure 8:
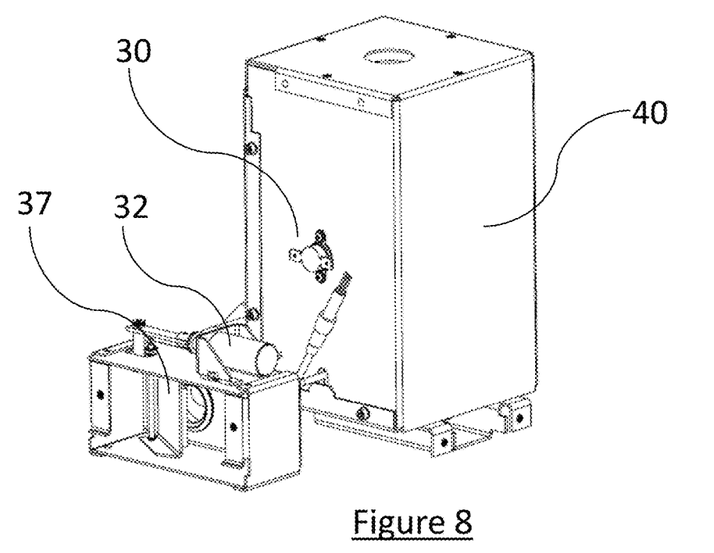
FIG. 8 illustrates another isometric view of the well and cooling system of FIG. 5, with a shutter unit shown.

The outlet of the Venturi pump (24) is connected by ducting (34) to an air outlet box (31). The air outlet box can include a shutter unit. As shown in FIGS. 6-8, the shutter unit can include a shutter (37) (e.g., a door) that is operated (e.g., pivoted) by an actuator, such as a linear solenoid (32) and a mechanical linkage (33). The shutter (37) can move between open and closed positions.

5. Control Board

Figure 9:
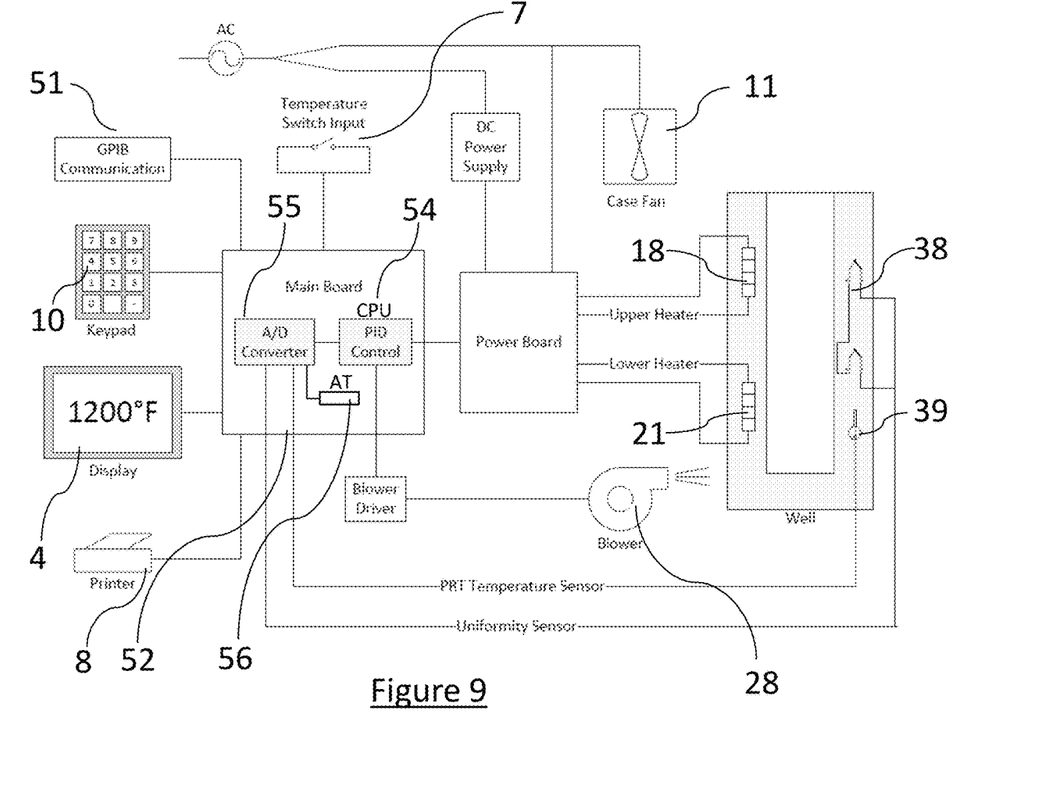
FIG. 9 schematically illustrates a block diagram of a dry well temperature calibration system, such as the system of FIG. 2A, and shows relationships between certain system components and a control panel.

Operation of the system (1) can be controlled by a controller, such as a control board (52), as schematically illustrated in FIG. 9. The control board (52) can include a CPU (central processing unit) (54), such as a processor and memory, for storing and executing the system's firmware. The control board (52) can include one or more analog-to-digital converters (55) for interfacing with temperature measurements from the UUT, the temperature sensors, or otherwise. The control board (52) can include PID (proportional-integral-derivative) controller configured to determine when to activate the heaters (18, 21) and cooling blower (28) per commands from the CPU. In some embodiments, an ambient temperature sensor (56) is located on or near the control board (52).

6. Operation—Heating

In preparation for testing a UUT (6) with the dry well calibrator (1), the operator can choose the correct size adapter chuck to be inserted into the well. FIG. 3 shows a UUT (e.g., a thermometer) properly inserted into an adapter chuck (12) with minimal clearance between the adapter chuck bore and the stem of the thermometer (6). An operator may input a target temperature (a set point) through the keypad (10), use a stored "ramp and soak" program, or arrange for set point information to be provided by remote communication, such as via the GPIB connection (51).

The control board (52) can use an analog-to-digital converter (55) for measurements of resistance values of the well's PRT sensor (39) and the ambient temperature sensor (56). Also, the analog voltage output of the uniformity sensor (38) can be measured. In some embodiments, the control board's CPU uses the measured data and a PID algorithm to calculate power requirements and activates the two heating elements (18, 21) accordingly.

In some embodiments, when the momentary power requirement is at or beyond a specific threshold (e.g., greater than or equal to about 200 Watts) then the control circuit activates an AC SCR modulated output to power the heating elements (18, 21). In some implementations, one or both heating elements are driven by AC power. When the well is powered by AC power, the CPU (54) activates the indicator LED (9) in red blinking mode.

The CPU (54) can be configured to monitor the detected temperature generally continuously. When the detected temperature gets close to the set point temperature, the PID algorithm reduces the power output of the heating elements (18, 21).

In some embodiments, when the power output from the AC power source is under a specific threshold (e.g., less than 200 Watts) and/or when the well temperature is within a range of the set point, then the control circuit switches the power source to a DC power source, such as a 48 VDC regulated power supply. The DC power output can be fine-tuned by a PWM (pulse width modulation) circuit per the PID controller's requirements. The resolution of the DC voltage level is very fine due to the use of PWM that is tuned to the dynamic range of the heaters (18, 21). The heaters (18, 21) can be provided with sufficient power to maintain temperature stability at the set point. When DC power is used, the indicator light (9) can change color to blinking green, signaling that the well temperature is close to the target set point.

In certain embodiments, during ramping-up and soaking at temperature, a temperature uniformity algorithm can control the power to the upper heating element (18) and the lower heating element (21) as a response to the uniformity sensor (38) reading. The desired output of the uniformity sensor (38) should be zero so the CPU balances the power of the heating elements (18, 21) until the reading is within a specific tolerance from zero (e.g., about +/−0.2° F.). During heating and soaking, the primary energy loss from the well is through the layers of insulation (16, 20, 22) and the well case (40).

When an acceptable axial temperature uniformity in the well assembly (47) is reached, the indicator light (9) turns solid green, signaling that the measurement process can start. In the measurement process, the temperature difference between the UUT (6) reading and the displayed temperature on the display (4) is recorded after soaking for a predetermined time under stable temperature state (solid green indication).

7. Operation—Cooling

After the measurement process, the well assembly (47) may still be at an elevated temperature and may need to be cooled, such as to perform another test, to transport the system (1), etc. The process and mechanisms used for cooling the well assembly (47) can vary based on the temperature of the well assembly (47). For example, if the well temperature is greater than or equal to a threshold (e.g., about 650° F.) a first method (a "high temperature sequence") can be used and if the well temperature is less than the threshold a second method (a "low temperature sequence") can be used. Using one or more of these sequences, the system can efficiently and quickly cool the well assembly (47). In some embodiments, the system can cool the well assembly (47) from a temperature of about 1,200° F. to about 200° F. in less than or equal to about 45 minutes. This is a significant improvement over the 8 hours or more required by certain existing systems. In certain variants, the system can cool the well assembly (47) from about 1,200° F. to about 650° F. in less than or equal to about 25 minutes. In some embodiments, the system can cool the well assembly (47) from about 650° F. to about 200° F. in less than or equal to about 20 minutes, instead of the 2 hours or more needed by some other systems.

7A. High Temperature Sequence

In some implementations, the high temperature sequence uses air from the blower (28) to indirectly cool the well assembly (47). The high temperature sequence can include activating the blower (28), such as instructing the variable speed blower to full speed. The door (37) can be opened by the actuator, such the linear solenoid (32) through the link (33). This results in high airflow passing through the air handling system (including the Venturi pump nozzle (27)) and exiting from the air outlet box (31).

Due to the high speed of the airflow at or near the exit of the nozzle (27), a pressure difference is generated between the air opening (23) and the Venturi pump (24). Namely, the air in the Venturi pump (24) is at a lower pressure than the air at the opening (23). As a result, air from the groove (50) is drawn through the lower opening (23) and into the airflow in the Venturi pump (24). Thus, hot air is drawn out of the well assembly (47). At the same time, cool (e.g., ambient) air is drawn into the well assembly (47) by passing through the air conduit (15) and the upper opening (14). The cool air flows through the groove (50) that surrounds the heating elements (18, 21) and the exposed external wall of the well housing (13) and becomes hot air as a result. In several embodiments, cool air in the groove (50) contacts or flows directly adjacent to the well housing (13) to become hot air. The flow of hot air can be smooth and/or generally continuous through the groove (50) and/or into the Venturi pump (24). In some embodiments, air enters and exits the well assembly near a bottom end of the well assembly (47), such as entering through a lower end of the conduit (15) and exiting through a lower end of the groove (50).

In several embodiments, the airflow that cools the well housing (13) moves at least partly (and in some variants primarily) in a circumferential direction relative to the well housing (13). This can increase the distance and/or time that the air is in contact with the well housing (13), which can enhance the heat transfer compared to an axial (e.g., vertical) airflow. The airflow can move through the groove (50) in a spiral and/or helical path around the well housing (13). In some implementations, the airflow makes at least about 1.5, 2, 2.5, 3, 3.5, 4, 4.5, 5, or more revolutions around the well housing (13) during passage of such air through the well assembly (47). In several embodiments, during operation of the high temperature sequence, airflow travels in a downward direction. For example, in certain variants with a helical airflow groove, the airflow can travel from an upper end of the helix to a lower end of the helix. In certain embodiments, the cooling airflow does not flow primarily vertically, is not primarily conveyed by convection, and/or along a longitudinal axis of the well housing (13).

At the end of the groove (50), the flow of hot air reaches the lower air opening (23). As mentioned above, because of the pressure difference, the hot air is drawn out of the lower opening (23) and mixes with the high flow of cool air that flows through the Venturi pump (24). The resulting mixed airflow through the outlet box (31) is warm but is not hazardous. In some implementations, when the well is at a temperature of about 1,200° F., the discharged mixed air has a temperature of about 150° F. for time, which decreases with time. The air temperature can be further reduced in the adapter chuck (3) storage area when the warm air mixes with the airflow that is generated by the case fan (11). The flow of air through the groove (50) can be controlled by adjusting the speed of the blower (28) and/or the position of the shutter (37) (e.g., the amount open). In various embodiments, the airflow through the groove (50) is smooth, laminar, indirectly, and/or passively generated (e.g., without mechanically blowing air into the well assembly (47)). The first sequence can rapidly cool the well.

7B. Low Temperature Sequence

When the well's temperature has dropped to at or below the threshold (e.g., about 650° F.), or when the cooling process starts from a temperature level that is less than the threshold, the relatively small volume of airflow that is generated by the Venturi Pump action (24) is not effective for rapid cooling. A larger flow volume is needed due to smaller temperature difference between ambient airflow and the temperature of the well assembly (47). Thus, in certain implementations, the second sequence does not use the Venturi pump (24).

Instead, in some implementations, the second sequence uses air from the blower (28) to directly cool the well assembly (47) and/or includes reverses the airflow direction relative to the first sequence. In certain implementations, the shutter (37) is closed in the second sequence. This increases the air pressure in the conduits (34, 35) and causes the airflow inside the well assembly (47) to reverse direction relative to the direction in the first sequence. The airflow can enter into the well assembly (47) through the lower opening (23), travel along the groove (50), pass through the top opening (14), and exit from the bottom end of the conduit (15). In some embodiments, air enters and exits the well assembly near a bottom end of the well assembly (47), such as entering through a lower end of the groove (50) and exiting through a lower end of the conduit (15).

In some embodiments, the speed of the blower (28) is reduced in the second sequence compared to the first sequence. This can be because a smaller flow is needed for direct cooling of the well compared to the high flow that was needed for generation of a vacuum by the Venturi Pump when the blower cooled the well from a much higher temperature. The lower speed also results in lower sound level and helps extending the life of the blower (28).

8. Example Dry Well Low Temperature Calibration System

Figure 10:
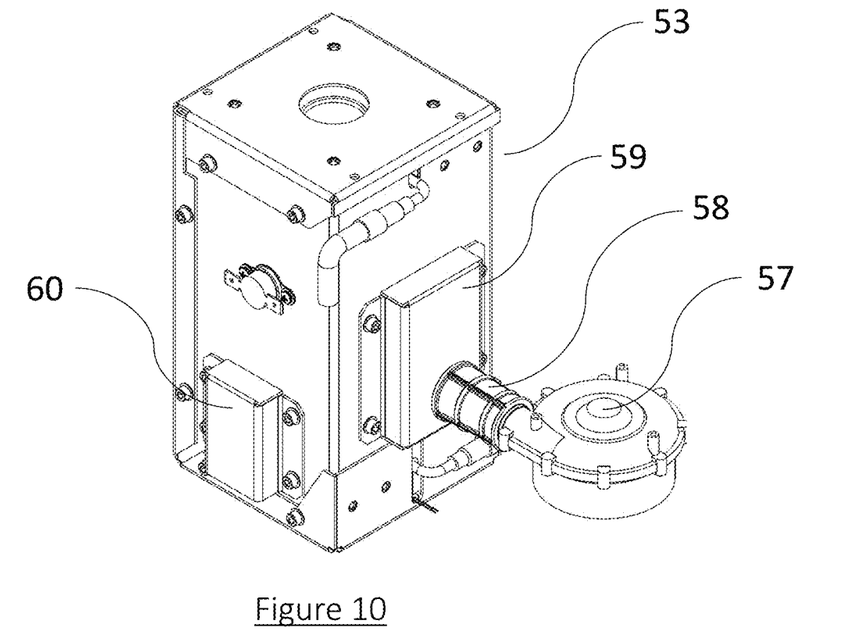
FIG. 10 illustrates an isometric view of another embodiment of a dry well temperature calibration system, such as a system adapted for low temperature use and/or utilizing direct airflow cooling.

Some embodiments of the system (1) are designed for use with a maximum well temperature of less than the threshold (e.g., about 650° F.). Certain such variants may do not incorporate the Venturi pump (24) at all, because the cooling is performed as direct flow cooling in one direction. FIG. 10 depicts an example, such as a well (53) that is used in a system that operates in the range of 95° F. to 650° F. The blower (57) connects through its adapter (58) to a conduit (59) that directs the blower's airflow to the top opening of the well (53). The airflow exists from the bottom opening of the other channel (60). The conduit (59) can comprise an upper channel and the channel (60) can comprise a lower channel. The internal groove (e.g., helical or spiral channel), openings, insulation, and internal components can be the same or similar to the structure of the well assembly (47) depicted in FIG. 3 and described above.

When hot air exists the channels (15, 60) in both well styles (47, 53) it mixes with the main flow that is generated by the case fan (11). In some embodiments of the system (1) includes a case blower is used instead of or in addition to a fan (11).

The cooling blower (28, 57) can control the cooling rate of the well (47, 53) by varying its speed. In some applications (e.g., a Temperature Switch Calibration), the temperature ramp rate in both direction (heating and cooling) should to be specific to the UUT, so the control board (52) can vary the blower's speed for controlling the desired cooling rate.

9. Other Systems

As mentioned above, the disclosed features, such as the cooling system, can be used in a variety of systems, including non-calibration systems, such as ovens, fireboxes, furnaces, or otherwise. In some implementations, the cooling system is incorporated in a kiln. The cooling system can include the air handling system discussed above, such the venturi-pump, upstream blower, shutter, reversing airflow, and/or otherwise. At a high temperature, the cooling system can draw hot air out of an opening (e.g., in the bottom) of the kiln, such as with the Venturi pump as discussed above in the high temperature sequence. This can allow the temperature to be reduced in a controlled and/or relatively slow manner, which can reduce or avoid cracking of materials in the kiln. At a lower temperature, the risk of cracking is greatly reduced, so it can be desirable to increase the cooling rate. In this regard, the cooling system can convert to pump air into the kiln. This can include reversing the airflow direction such that air flows into the kiln, such as by closing the shutter as discussed above in the low temperature sequence. The cooling system can significantly reduce kiln cooling time and/or enhance safety, which otherwise may require 10 hours or more and may require opening the kiln door. For example, some embodiments are able to decrease cooling time by about 50% (e.g., to about 5 hours) while maintaining the door closed. Keeping the door closed can beneficially avoid safety risks and issues associated with the heat chamber being open while hot. For example, keeping the door closed avoids a situation in which hot air could otherwise rapidly exit through the open door and travel upward by convection, which could trigger fire protection equipment (e.g., alarms, sprinklers, etc.) or require the installation of specialized equipment, such as an exhaust hood. Certain embodiments are configured to discharge warm mixed air (e.g., a mix of hot air from the heat chamber and cool air from ambient) into the ambient environment, such as into a room inside a building. In some embodiments, the mixed air is discharged to an outside environment, such as through a wall of the building. In certain implementations, the mixed air flows beneath the heat chamber and/or through a flexible duct. In several embodiments, the cooling system is configured to draw air in a downward direction and/or not to use convection as the mechanism for moving air.

10. Certain Terminology

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees and the term "generally perpendicular" can refer to something that departs from exactly perpendicular by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

11. Summary

The technology of the present disclosure has been discussed in the context of certain embodiments and examples. The technology extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of the invention. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale is not limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of dry well temperature calibration systems, cooling systems for dry wells and other articles, and related methods have been disclosed. Although the systems and methods have been disclosed in the context of those embodiments and examples, the technology of this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described above, but should be determined only by a fair reading of the claims that follow.

The following is claimed:

1. A dry well temperature calibration system comprising:
a well configured to receive a unit under test;
a heater configured to heat the well;
a temperature sensor configured to detect a temperature of the well;
an airflow passage encircling the well; and
an air handling system comprising:
a blower;
a movable shutter door; and
a venturi pump unit in fluid communication with the airflow passage, the venturi pump unit configured to draw a flow of air through the airflow passage, thereby cooling the well.

2. The system of claim 1, wherein the venturi pump unit is further configured to draw the flow of air downward through the airflow passage.

3. The system of claim 1, wherein the venturi pump unit is positioned at an outlet opening of the airflow passage.

4. The system of claim 1, wherein the air handling system is configured to convey air in a direction that is generally perpendicular to a longitudinal axis of the well.

5. The system of claim 1, wherein the blower is positioned upstream of the venturi pump unit.

6. A dry well temperature calibration system comprising:
a dry well assembly comprising a heat chamber; and
a cooling system configured to cool the heat chamber, the cooling system comprising:
a blower;
a venturi pump unit positioned downstream of the blower, the venturi pump unit in fluid communication with an opening in the heat chamber; and
a shutter door positioned downstream of the venturi pump unit, the shutter door configured to move between an open position and a closed position;
the cooling system configured such that, during operation of the blower:
when the shutter door is in the open position, the cooling system pulls air out of the opening in the heat chamber; and
when the shutter door is in the closed position, the cooling system pushes air into the opening in the heat chamber.

7. The system of claim 6, further comprising a temperature sensor configured to detect a temperature of the heat chamber.

8. The system of claim 7, wherein the system is further configured to move the shutter door from the open position to the closed position in response to the detected temperature of the heat chamber being less than or equal to a threshold temperature.

9. The system of claim 8, wherein the threshold temperature is about 650° F.

10. The system of claim 6, further comprising a linear actuator configured to move the door between the open position and the closed position.

11. A ceramic baking system comprising a kiln and the cooling system of claim 6, wherein the kiln comprises the heat chamber.

12. A dry well temperature calibration system comprising:
a well configured to receive a unit under test;
a heater configured to heat the well;
a temperature sensor configured to detect a temperature of the well;
a dual power supply in operative communication with the heater, the dual power supply comprising an AC power source and a DC power source;
a controller in operative communication with the temperature sensor and dual power supply; and
the system configured to power the heater with the AC power source in a first stage, and to power the heater with the DC power source in a second stage, wherein the second stage occurs during at least a temperature soak period of operation of the dry well temperature calibration system.

13. The system of claim 12, wherein the AC power source comprises an unregulated AC power supply and the DC power source comprises a regulated DC power supply.

14. The system of claim 12, wherein the DC power source comprises a battery.

15. The system of claim 12, wherein the system is configured to change from the first stage to the second stage in response to the controller determining that a power output from the AC power source is less than or equal to a threshold value.

* * * * *